(12) United States Patent
Seetharaman et al.

(10) Patent No.: US 12,712,453 B2
(45) Date of Patent: Aug. 18, 2026

(54) SWITCHING CONVERTER CONTROLLER WITH ADAPTIVE SLOPE COMPENSATION

(71) Applicant: TEXAS INSTRUMENTS INCORPORATED, Dallas, TX (US)

(72) Inventors: Narayanan Seetharaman, Freising (DE); Puneet Sareen, Freising (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 272 days.

(21) Appl. No.: 18/674,836

(22) Filed: May 25, 2024

(65) Prior Publication Data

US 2025/0175079 A1 May 29, 2025

Related U.S. Application Data

(60) Provisional application No. 63/602,807, filed on Nov. 27, 2023.

(51) Int. Cl.
*H02M 3/158* (2006.01)
*H02M 1/00* (2006.01)

(52) U.S. Cl.
CPC ......... *H02M 3/158* (2013.01); *H02M 1/0009* (2021.05)

(58) Field of Classification Search
CPC ...... H02M 3/156; H02M 3/157; H02M 3/158; H02M 1/0009; H02M 1/0012; H02M 1/0016
See application file for complete search history.

(56) References Cited

U.S. PATENT DOCUMENTS

| | | | | |
|---|---|---|---|---|
| 7,265,530 | B1 | 9/2007 | Broach | |
| 8,278,899 | B2 | 10/2012 | Schafmeister | |
| 8,729,880 | B2 * | 5/2014 | McCloy-Stevens | H02M 3/1588 323/285 |
| 11,381,167 | B2 * | 7/2022 | Munroe | H02M 3/157 |
| 11,563,378 | B2 * | 1/2023 | Becker | H02M 1/14 |
| 2006/0176098 | A1 * | 8/2006 | Chen | H02M 3/156 327/341 |
| 2025/0038644 | A1 * | 1/2025 | Pahkala | H02M 1/088 |

OTHER PUBLICATIONS

International Search Report mailed Mar. 17, 2025.
(Continued)

*Primary Examiner* — Adolf D Berhane
(74) *Attorney, Agent, or Firm* — Charles F. Koch

(57) ABSTRACT

A system includes: a power stage having a first terminal, a second terminal, a third terminal, and a fourth terminal; and a controller having a first terminal, a second terminal, a third terminal, a fourth terminal, and a fifth terminal. The first terminal of the controller is coupled to the fourth terminal of the power stage. The second terminal of the controller is coupled to the third terminal of the power stage. The third terminal of the controller is coupled to the first terminal of the power stage. The fourth terminal of the controller is coupled to the second terminal of the controller. The controller includes an adaptive slope compensation circuit configured to: obtain input parameters; adjust a scaling factor responsive to the input parameters; adapt a slope compensation current responsive to the scaling factor; and output a slope compensation signal responsive to the adapted slope compensation current.

20 Claims, 8 Drawing Sheets

(56) References Cited

OTHER PUBLICATIONS

Li Yanming et al: "An Adaptive Slope Compensation Circuit for Buck DC-DC Converter", 2013 IEEE 10th International Conference on ASIC, Oct. 1, 2007 (Oct. 1, 2007), pp. 608-611, XP055869261, ISSN: 2162-7541, DOI: 10.1109/ICASIC.2007.4415704, ISBN: 978-1-4673-6415-7, pp. 608-611; figures 1, 3, 4.

* cited by examiner 576
577
578
579
VDD
580
519
M9
M10
M11
M12
M8
M7
530
536
534
532
538
522
526
524
523
528
521
586
520
I_FSW
518
I_ASC
592
R11
C_SC
T1
T3
S1
T2
GND
CS_S1
590
574
M14
1X:4X
M13
570
572
575
568
560
VDD
562
A X B
C
569
594
564
565
566
VOUT
504
584
R4
R5
514
516
512
517
M5
M6
R6
M4
R10
506
R9
R8
505
M3
M2
M1
R3
510
507
508
509
502
VIN
582
503
R1
R2
558
550
552
559
554
555
556
I_RIPPLE
588
548
542
540
549
544
545
546
R7
500

SWITCHING CONVERTER CONTROLLER WITH ADAPTIVE SLOPE COMPENSATION

The present application claims priority to U.S. Provisional Application No. 63/602,807, titled "Novel Technique for Self Adaptive Slope Compensation Circuit for Most Optimal Transient Performance Without External Components for DCDC Switching Converters", filed on Nov. 27, 2023, which is hereby incorporated by reference in its entirety.

BACKGROUND

Switching converters are used to provide a direct-current (DC) output voltage (VOUT) based on an input voltage (VIN). A typical switching converter includes: a power stage with switches and an inductor; and a controller for the switches of the power stage. Switching converter efficiency varies depending on proper management of switching control responsive to variations in VIN, VOUT, load, operating frequency, and inductance. Mode transitions of the controller in response to load changes (e.g., light load to heavy load, or heavy load to light load) are problematic, often causing inefficient operation and/or VOUT overshoot, undershoot and other disturbances.

SUMMARY

In an example, a system includes: a power stage having a first terminal, a second terminal, a third terminal, and a fourth terminal; and a controller having a first terminal, a second terminal, a third terminal, a fourth terminal, and a fifth terminal. The first terminal of the controller is coupled to the fourth terminal of the power stage. The second terminal of the controller is coupled to the third terminal of the power stage. The third terminal of the controller is coupled to the first terminal of the power stage. The fourth terminal of the controller is coupled to the second terminal of the controller. The controller includes an adaptive slope compensation circuit configured to: obtain input parameters; adjust a scaling factor responsive to the input parameters; adapt a slope compensation current responsive to the scaling factor; and output a slope compensation signal responsive to the adapted slope compensation current.

In another example, a switching converter controller includes: current sense circuitry having a first terminal and a second terminal; adaptive slope compensation circuitry having a first terminal and a second terminal, the second terminal of the adaptive slope compensation circuitry coupled to the second terminal of the current sense circuitry, and the adaptive slope compensation circuitry including a multiplier; a comparator having a first terminal, a second terminal, and a third terminal, the first terminal of the comparator coupled to second terminal of the current sense circuitry and to the second terminal of the adaptive slope compensation circuitry the adaptive slope compensation circuitry; and mode control logic having a first terminal and a second terminal, the first terminal of the mode control logic coupled to the third terminal of the comparator.

In yet another example, a switching converter controller includes: current sense circuitry; adaptive slope compensation circuitry coupled to the current sense circuitry; and a comparator coupled to the current sense circuitry and the adaptive slope compensation circuitry. The adaptive slope compensation circuitry includes adjustable current source circuitry, a capacitor, and a switch. The adaptive slope compensation circuitry is configured to: obtain input parameters and a switch control signal; use the adjustable current source circuitry to adapt a slope compensation current responsive to the input parameters; control the switch to adjust a charge on the capacitor responsive to the adapted slope compensation current and the switch control signal; and output a slope compensation signal based on the charge on the capacitor.

DETAILED DESCRIPTION

Figure 1:
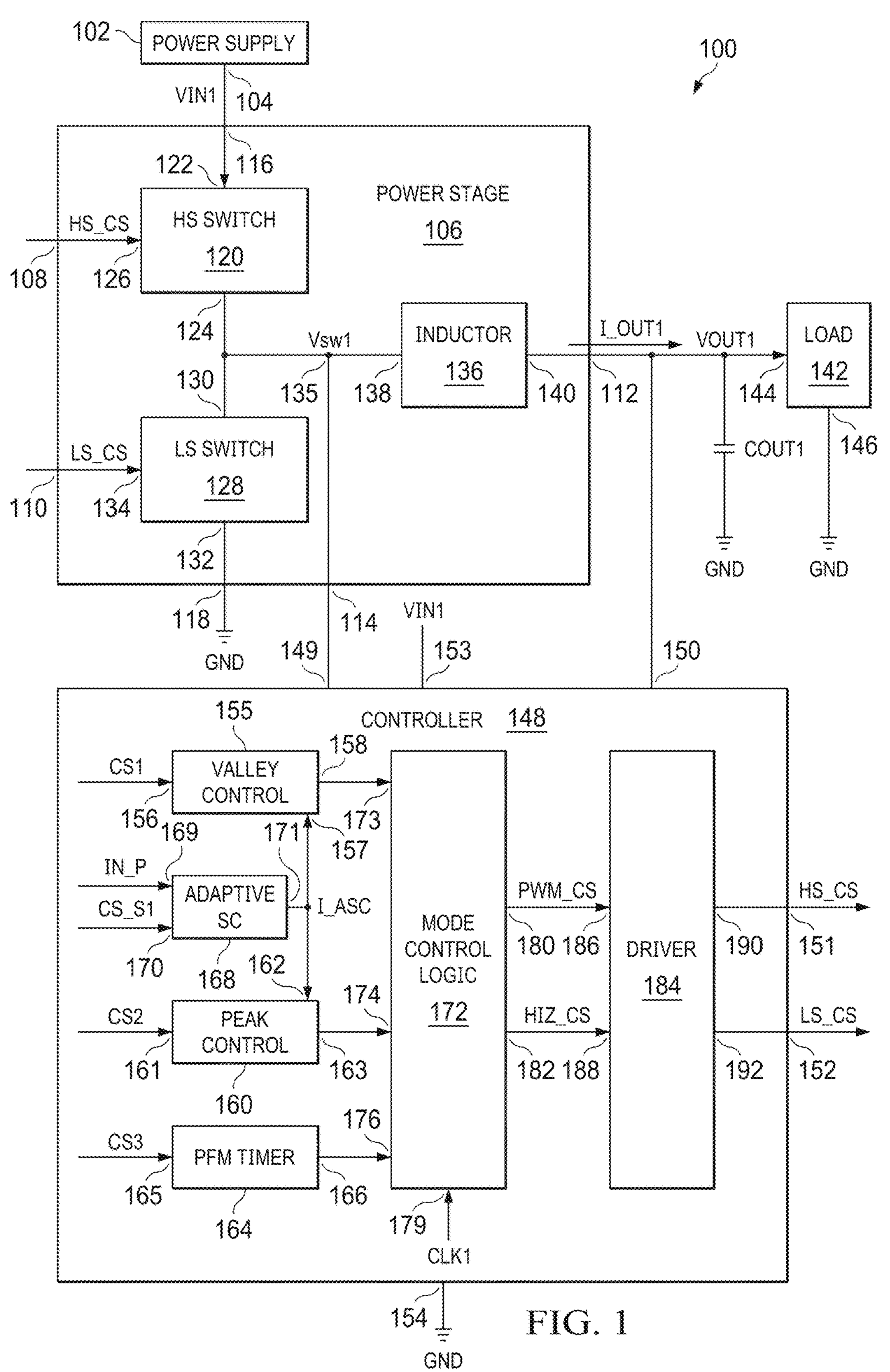
FIG. 1 is a diagram showing an example system.

The same reference numbers or other reference designators are used in the drawings to designate the same or similar features. Such features may be the same or similar either by function and/or structure.

FIG. 1 is a diagram showing an example system 100. The system 100 includes a power supply 102, a power stage 106, an output capacitor COUT1, a load 142, and a controller 148. The power supply 102 has a terminal 104. The power stage 106 has a first terminal 108, a second terminal 110, a third terminal 112, a fourth terminal 114, a fifth terminal 116, and a sixth terminal 118. The output capacitor COUT1 has a first terminal and a second terminal. The load 142 has a first terminal 144 and a second terminal 146. The controller 148 has a first terminal 149, a second terminal 150, a third terminal 151, a fourth terminal 152, a fifth terminal 153, and a sixth terminal 154.

As shown, the power stage 106 includes a high-side (HS) switch 120, a low-side (LS) switch 128, and an inductor 136 in the arrangement shown. In some examples, the HS switch 120, LS switch 128, and related control circuitry are components of an integrated circuit (IC), while the inductor 136 is an external component relative to the IC. The arrangement of components for the power stage 106 of FIG. 1 is referred to as a buck converter topology, where the output voltage VOUT is lower than the input voltage VIN. In other examples, the topology of the power stage 106 may vary (e.g., a boost converter topology as in FIG. 2, or a boost-buck converter topology may be used). In the example of FIG. 1, the HS switch 120 has a first terminal 122, a second terminal 124, and a control terminal 126. The LS switch 128 has a first terminal 130, a second terminal 132, and a control terminal 134. In some examples, the HS switch 120 may be a p-channel field-effect transistor ("PFET") or an n-channel field-effect transistor ("NFET"), and the LS switch 128 may be an NFET. The inductor 136 has a first terminal 138 and a second terminal 140.

The controller 148 includes valley control circuitry 155, peak control circuitry 160, pulse-frequency modulation (PFM) timer circuitry 164, adaptive slope compensation (SC) circuitry 168, mode control logic 172, and driver circuitry 184. The valley control circuitry 155 has first terminal(s) 156, a second terminal 157, and a third terminal 158. The peak control circuitry 160 has first terminal(s) 161, a second terminal 162, and a third terminal 163. The PFM timer circuitry 164 has first terminal(s) 165 and a second terminal 166. The adaptive slope compensation circuitry 168 has a first terminal 169, a second terminal 170, and a third terminal 171. The mode control logic 172 has a first terminal 173, a second terminal 174, a third terminal 176, a fourth terminal 179, a fifth terminal 180, and a sixth terminal 182. The driver circuitry 184 has a first terminal 186, a second terminal 188, a third terminal 190, and a fourth terminal 192.

The first terminal 108 of the power stage 106 is coupled to the third terminal 151 of the controller 148. The second terminal 110 of the power stage 106 is coupled to the fourth terminal 152 of the controller 148. The third terminal 112 of the power stage 106 is coupled to the first terminal of the output capacitor COUT1, the first terminal 144 of the load 142, and the second terminal 150 of the controller 148. The second terminal of the output capacitor COUT1 is coupled to ground or a ground terminal. The second terminal 146 of the load 142 is coupled to ground or a ground terminal. The fourth terminal 114 of the power stage 106 is coupled to the first terminal 149 of the controller 148. The fifth terminal 116 of the power stage 106 is coupled to the terminal 104 of the power supply 102. The terminal 104 of the power supply 102 is also coupled to the fifth terminal 153 of the controller 148. The sixth terminal 118 of the power stage 106 is coupled to ground or a ground terminal. The sixth terminal 154 of the controller 148 is also coupled to ground or a ground terminal.

As shown, the first terminal 122 of the HS switch 120 is coupled to the fifth terminal 116 of the power stage 106. The second terminal 124 of the HS switch 120 is coupled to the first terminal 130 of the LS switch 128 and to the first terminal 138 of the inductor 136. The second terminal 140 of the inductor 136 is coupled to the third terminal 112 of the power stage 106. The control terminal 126 of the HS switch 120 is coupled to the first terminal 108 of the power stage 106. The second terminal 132 of the LS switch 128 is coupled to the sixth terminal 118 of the power stage 106. The control terminal 134 of the LS switch 128 is coupled to the second terminal 110 of the power stage 106. As shown, the fourth terminal 114 of the power stage is coupled to a switch node 135 between the HS switch 120 and the LS switch 128.

As shown, the first terminal(s) 156 of the valley control circuitry 155 receive control signal(s) CS1. In some examples, CS1 includes a valley threshold and an inductor current sense signal. In some examples, the valley threshold and/or the inductor current sense signal are ramped. The first terminal(s) 161 of the peak control circuitry 160 receive control signal(s) CS2. In some examples, CS2 includes a peak threshold and an inductor current sense signal. The first terminal(s) 165 of the PFM timer circuitry 164 receive control signal(s) CS3. In some examples, CS3 includes a control voltage (e.g., V_CTRL herein). In some examples, V_CTRL is the error result between VOUT and a reference voltage (VREF). The first terminal 169 of the adaptive slope compensation circuitry 168 receives input parameter(s) IN_P. Example input parameters include VIN, VOUT, L (the value of the inductor 136), a switching frequency (FSW) of power stage switches, a current sense gain, and/or other input parameters. The second terminal 170 of the adaptive slope compensation circuitry 168 receives a switch control signal CS_S1. The third terminal 171 of the adaptive slope compensation circuitry 168 is coupled to the second terminal 157 of the valley control circuitry 155 and the second terminal 162 of the peak control circuitry 160.

The first terminal 173 of the mode control logic 172 is coupled to the third terminal 158 of the valley control circuitry 155. The second terminal 174 of the mode control logic 172 is coupled to the third terminal 163 of the peak control circuitry 160. The third terminal 176 of the mode control logic 172 is coupled to the second terminal 166 of the PFM timer circuitry 164. The fourth terminal 179 of the mode control logic 172 receives a clock signal (CLK1). The fifth terminal 180 of the mode control logic 172 is coupled to the first terminal 186 of the driver circuitry 184. The sixth terminal 182 of the mode control logic 172 is coupled to the second terminal 188 of the driver circuitry 184. The third terminal 190 of the driver circuitry 184 is coupled to the third terminal 151 of the controller 148. The fourth terminal 192 of the driver circuitry 184 is coupled to the fourth terminal 152 of the controller 148.

In operation, the controller 148 is configured to: receive VIN1 at its fifth terminal 153; receive $V_{SW1}$ at its first terminal 149; receive VOUT1 at its second terminal 150; provide HS_CS at its third terminal 151 responsive to VIN1, $V_{SW1}$, VOUT1, and the operations of the adaptive slope compensation circuitry 168, the valley control circuitry 155, the peak control circuitry 160, the PFM timer circuitry 164, the mode control logic 172, and the driver circuitry 184; and provide LS_CS at its fourth terminal 152 responsive to VIN1, $V_{SW1}$, VOUT11, and the operations of the adaptive slope compensation circuitry 168, the valley control circuitry 155, the peak control circuitry 160, the PFM timer circuitry 164, the mode control logic 172, and the driver circuitry 184. In some examples, modes supported by the controller 148 include a pulse-width modulation (PWM) mode and a PFM mode. In some examples, the valley control circuitry 155, the peak control circuitry 160, the PFM timer circuitry 164 may provide respective standalone control options for the controller 148 (i.e., only one of the valley control circuitry 155, the peak control circuitry 160, and the PFM timer circuitry 164 is active). In other examples, the valley control circuitry 155, the peak control circuitry 160, the PFM timer circuitry 164 may provide different combinations of control options. In one example, the valley control circuitry 155 and the peak control circuitry 160 are active together. In another example, the valley control circuitry 155 and the PFM timer circuitry 164 are active together. In another example, the peak control circuitry 160 and the PFM timer circuitry 164 are active together. In another example, the valley control circuitry 155, the peak control circuitry 160, and the PFM timer circuitry 164 are active together.

In operation, the power stage 106 is configured to: receive VIN1 at its fifth terminal 116; receive HS_CS at its first terminal 108; receive LS_CS at its second terminal 110; provide VOUT1 at its third terminal 112 responsive to VIN1, HS_CS, and LS_CS; and provide $V_{SW1}$ at its fourth terminal 114 responsive to VIN1, HS_CS, and LS_CS. More specifically, the HS switch 120 couples VIN1 to the switch node 135 responsive to HS_CS, which increases the current in the inductor 136. The LS switch 128 couples the sixth terminal 118 to the switch node 135 responsive to LS_CS, which decreases the current in the inductor 136. The average current in the inductor 136 is considered the load current (I_out1) provided to the load 142. In some examples, VIN1 may be 2.5V to 40V, VOUT1 may be 0.3V to 6V. In some examples, I_out1 may be 0 to 1 A during PFM mode. During PWM mode, I_out1 may be 0 to 10 A.

Figure 2:
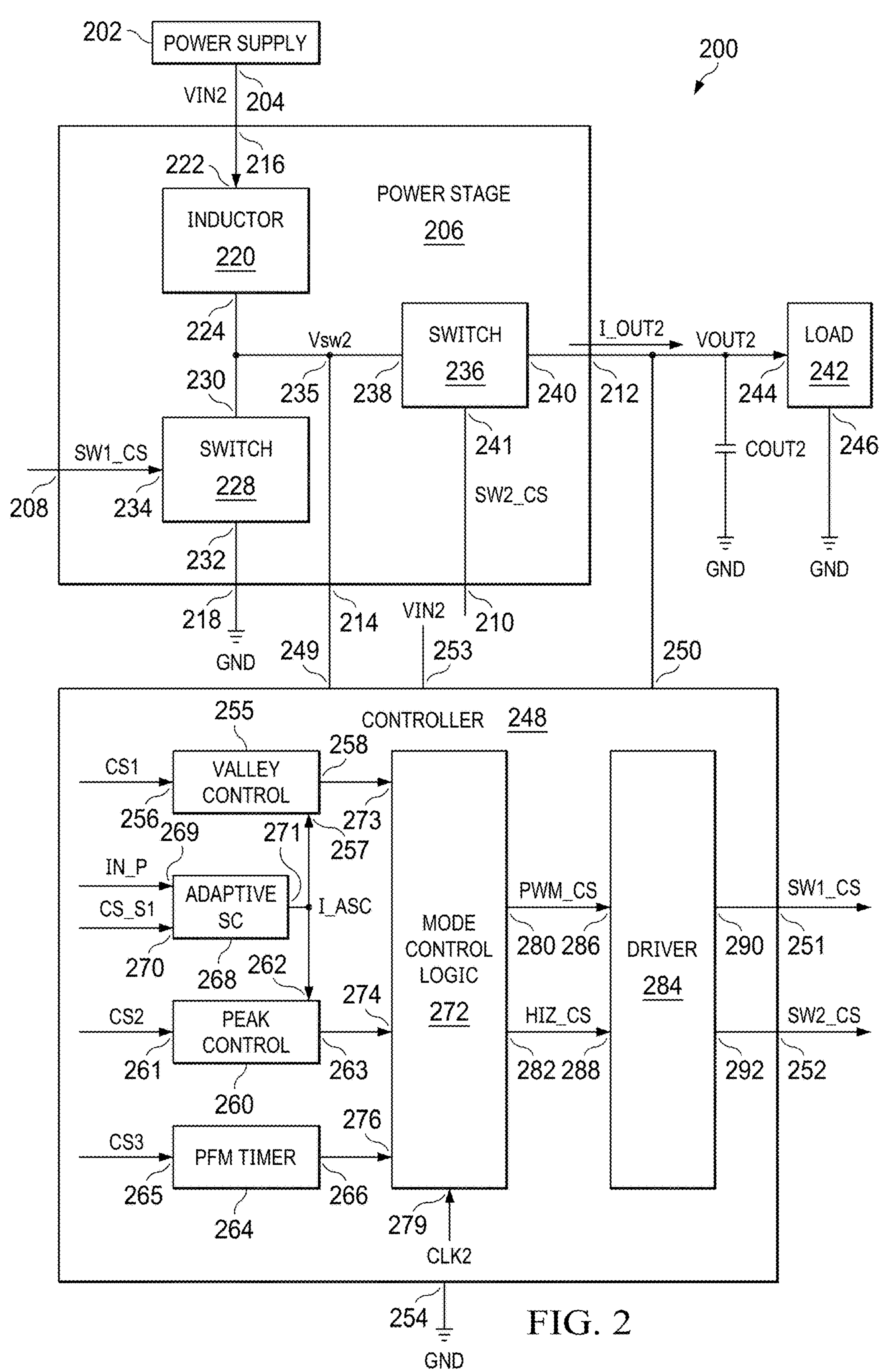
FIG. 2 is a diagram showing another example system.

FIG. 2 is a diagram showing another example system 200. Compared to the system 100, the system 200 has a boost converter topology instead of a buck converter. The system 200 includes a power supply 202, a power stage 206, an output capacitor COUT2, a load 242, and a controller 248. The power supply 202 has a terminal 204. The power stage 206 has a first terminal 208, a second terminal 210, a third terminal 212, a fourth terminal 214, a fifth terminal 216, and a sixth terminal 218. The output capacitor COUT2 has a first terminal and a second terminal. The load 242 has a first terminal 244 and a second terminal 246. The controller 248 has a first terminal 249, a second terminal 250, a third terminal 251, a fourth terminal 252, a fifth terminal 253, and a sixth terminal 254.

As shown, the power stage 206 includes an inductor 220, a first switch 228, and a second switch 236 in the arrangement shown. In some examples, the first switch 228, the second switch 236, and related control circuitry are components of an IC, while the inductor 220 is an external component relative to the IC. The arrangement of components for the power stage 206 of FIG. 2 is referred to as a boost converter topology, where the output voltage VOUT2 is higher than the input voltage VIN2. In other examples, a power stage may have a buck-boost converter topology. In the example of FIG. 2, the first switch 228 has a first terminal 230, a second terminal 232, and a control terminal 234. The second switch 236 has a first terminal 238, a second terminal 240, and a control terminal 241. In some examples, the first switch 228 may be NFET, and the second switch 236 may be a PFET or an NFET. The inductor 220 has a first terminal 222 and a second terminal 224.

The controller 248 includes valley control circuitry 255, peak control circuitry 260, PFM timer circuitry 264, adaptive slope compensation circuitry 268, mode control logic 272, and driver circuitry 284. The valley control circuitry 255 has first terminal(s) 256, a second terminal 257, and a third terminal 258. The peak control circuitry 260 has first terminal(s) 261, a second terminal 262, and a third terminal 263. The PFM timer circuitry 264 has first terminal(s) 265 and a second terminal 266. The adaptive slope compensation circuitry 268 has a first terminal 269, a second terminal 270, and a third terminal 271. The mode control logic 272 has a first terminal 273, a second terminal 274, a third terminal 276, a fourth terminal 279, a fifth terminal 280, and a sixth terminal 282. The driver circuitry 284 has a first terminal 286, a second terminal 288, a third terminal 290, and a fourth terminal 292.

The first terminal 208 of the power stage 206 is coupled to the third terminal 251 of the controller 248. The second terminal 210 of the power stage 206 is coupled to the fourth terminal 252 of the controller 248. The third terminal 212 of the power stage 106 is coupled to the first terminal of the output capacitor COUT2, the first terminal 244 of the load 142, and the second terminal 250 of the controller 248. The second terminal of the output capacitor COUT2 is coupled to ground or a ground terminal. The second terminal 246 of the load 242 is coupled to ground or a ground terminal. The fourth terminal 214 of the power stage 206 is coupled to the first terminal 249 of the controller 248. The fifth terminal 216 of the power stage 206 is coupled to the terminal 204 of the power supply 202. The terminal 204 of the power supply 202 is also coupled to the fifth terminal 253 of the controller 248. The sixth terminal 218 of the power stage 206 is coupled to ground or a ground terminal. The sixth terminal 254 of the controller 248 is also coupled to ground or a ground terminal.

As shown, the first terminal 222 of the inductor 220 is coupled to the fifth terminal 216 of the power stage 106. The second terminal 224 of the inductor 220 is coupled to the first terminal 230 of the first switch 228 and to the first terminal 238 of the second switch 236. The second terminal 232 of the first switch 228 is coupled to the sixth terminal 218 of the power stage 206. The control terminal 234 of the first switch 228 is coupled to the first terminal 208 of the power stage 206. The second terminal 240 of the second switch 236 is coupled to the third terminal 212 of the power stage 206. The control terminal 241 of the second switch 236 is coupled to the second terminal 210 of the power stage 106. As shown, the fourth terminal 214 of the power stage is coupled to a switch node 235 between the first switch 228 and the second switch 236.

As shown, the first terminal(s) 256 of the valley control circuitry 255 receive control signal(s) CS1. In some examples, CS1 includes a valley threshold and an inductor current sense signal. In some examples, the valley threshold and/or the inductor current sense signal are ramped. The first terminal(s) 261 of the peak control circuitry 260 receive control signal(s) CS2. In some examples, CS2 includes a peak threshold and an inductor current sense signal. The first terminal(s) 265 of the PFM timer circuitry 264 receive control signal(s) CS3. In some examples, CS3 includes a control voltage (e.g., V_CTRL herein). In some examples, V_CTRL is the error result between VOUT and a reference voltage (VREF). The first terminal 269 of the adaptive slope compensation circuitry 268 receives input parameter(s) IN_P. Example input parameters include VIN, VOUT, L (the value of the inductor 220), the FSW of power stage switches, a current sense gain, and/or other input parameters. The second terminal 270 of the adaptive slope compensation circuitry 268 receives a switch control signal CS_S1. The third terminal 271 of the adaptive slope compensation circuitry 268 is coupled to the second terminal 257 of the valley control circuitry 255 and the second terminal 262 of the peak control circuitry 260.

The first terminal 273 of the mode control logic 272 is coupled to the third terminal 258 of the valley control circuitry 255. The second terminal 274 of the mode control logic 272 is coupled to the third terminal 263 of the peak control circuitry 260. The third terminal 276 of the mode control logic 272 is coupled to the second terminal 266 of the PFM timer circuitry 264. The fourth terminal 279 of the mode control logic 272 receives a clock signal (CLK2). The fifth terminal 280 of the mode control logic 272 is coupled to the first terminal 286 of the driver circuitry 284. The sixth terminal 282 of the mode control logic 272 is coupled to the second terminal 288 of the driver circuitry 284. The third terminal 290 of the driver circuitry 284 is coupled to the third terminal 251 of the controller 248. The fourth terminal 292 of the driver circuitry 284 is coupled to the fourth terminal 252 of the controller 248.

In operation, the controller 248 is configured to: receive VIN2 at its fifth terminal 253; receive $V_{SW2}$ at its first terminal 249; receive VOUT2 at its second terminal 250; provide SW1_CS at its third terminal 251 responsive to VIN2, $V_{SW2}$, VOUT2, and the operations of the adaptive slope compensation circuitry 268, the valley control circuitry 255, the peak control circuitry 260, the PFM timer circuitry 264, the mode control logic 272, and the driver circuitry 284; and provide SW2_CS at its fourth terminal 252 responsive to VIN2, $V_{SW2}$, VOUT2, and the operations of the adaptive slope compensation circuitry 268, the valley control circuitry 255, the peak control circuitry 260, the PFM timer circuitry 264, the mode control logic 272, and the driver circuitry 284. In some examples, modes supported by the controller 248 include a PWM mode and a PFM mode.

In operation, the power stage 206 is configured to: receive VIN2 at its fifth terminal 216; receive SW1_CS at its first terminal 208; receive SW2_CS at its second terminal 210; provide VOUT2 at its third terminal 212 responsive to VIN2, SW1_CS, and SW2_CS; and provide $V_{SW2}$ at its fourth terminal 214 responsive to VIN2, SW1_CS, and SW2_CS. More specifically, when the first switch 228 is on and the second switch 236 is off, current in the inductor 220 increases. When the first switch 228 is off and the second switch 236 is on, current in the inductor 220 decreases. The average current in the inductor 136 is considered the load current (I_out2) provided to the load 242.

Figure 3A:
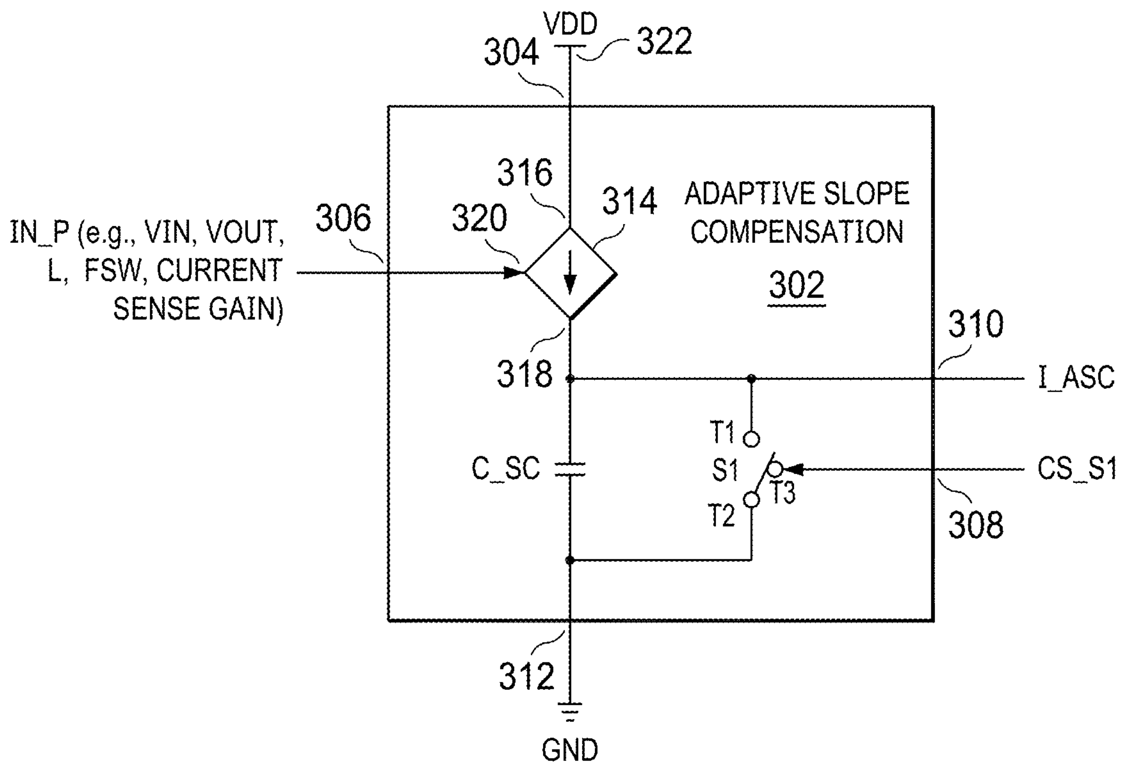
FIG. 3A is a diagram of example adaptive slope compensation circuitry.

FIG. 3A is a diagram of example adaptive slope compensation circuitry 302. The adaptive slope compensation circuitry 302 is an example of the adaptive slope compensation circuitry 168 in FIG. 1, or the adaptive slope compensation circuitry 268 in FIG. 2. The adaptive slope compensation circuitry 302 has a first terminal 304, a second terminal 306, a third terminal 308, a fourth terminal 310, and a fifth terminal 312. As shown, the first terminal 304 of the adaptive slope compensation circuitry 302 is coupled to a voltage source (VDD) terminal 322. The second terminal 306 of the adaptive slope compensation circuitry 302 receives input parameters IN_P. Example input parameters include an input voltage VIN, an output voltage VOUT, an inductance L, FSW, a current sense gain, and/or other input parameters. The third terminal 308 receive a control signal (CS_S1). The fourth terminal 310 provides an adaptive slope compensation current (I_ASC). The fifth terminal 312 is coupled to ground or a ground terminal.

In the example of FIG. 3A, the adaptive slope compensation circuitry 302 includes adjustable current source circuitry 314, a capacitor C_SC, and a switch S1 in the arrangement shown. The adjustable current source circuitry 314 has a first terminal 316, a second terminal 318, and a control terminal 320. The capacitor C_SC has a first terminal and a second terminal. The switch S1 has a first terminal T1, a second terminal T2, and a control terminal T3.

As shown, the first terminal 316 of the adjustable current source circuitry 314 is coupled to the first terminal of the adaptive slope compensation circuitry 302. The second terminal 318 of the adjustable current source circuitry 314 is coupled to the first terminal 304 of the capacitor C_SC and the first terminal T1 of the switch S1. The control terminal 320 of the adjustable current source circuitry 314 is coupled to the second terminal 306 of the adaptive slope compensation circuitry 302. The second terminal of the capacitor C_SC and the second terminal T2 of the switch S1 are coupled to the fifth terminal 312 of the adaptive slope compensation circuitry 302. The control terminal T3 of the switch S1 is coupled to the third terminal 308 of the adaptive slope compensation circuitry 302. As shown, the fourth terminal 310 of the adaptive slope compensation circuitry 302 is coupled to the second terminal 318 of the adjustable current source circuitry 314, the first terminal of the capacitor C_SC, and the first terminal T1 of the switch S1.

In operation, the adaptive slope compensation circuitry 302 is configured to: receive VDD at the first terminal 304; receive the input parameters at the second terminal 306; receive CS_S1 at the third terminal 308; and generate I_ASC waveform at the fourth terminal 310 responsive to VDD, the input parameters, and CS_S1. In some examples, the current output from the second terminal 318 of the adjustable current source circuitry 314 is a function of VOUT, VIN, FSW, I_RIPPLE and C_SC. In some examples, the current output from the second terminal 318 of the adjustable current source circuitry 314 is given as:

$$\propto \times \frac{VOUT}{VIN} \times FSW \times \text{I\_RIPPLE} \times \text{C\_SC},$$

where ∝ is a scaling factor.

Figure 3B:
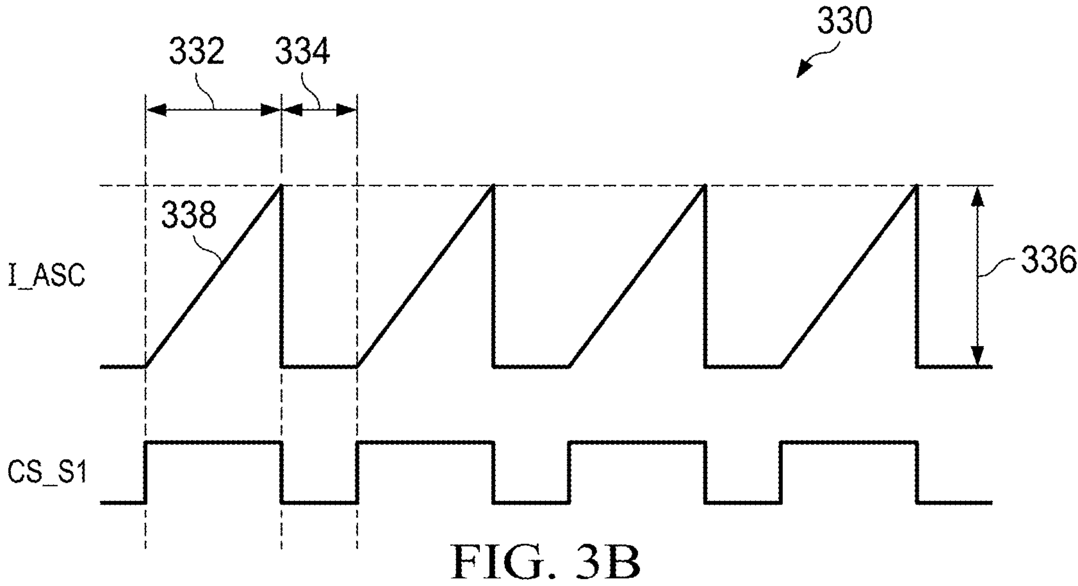
FIG. 3B is a timing diagram showing a slope compensation current and a related control signal, in an example.

In some examples, FIG. 3B is a timing diagram 330 showing an I_ASC waveform and CS_S1. In FIG. 3B, I_ASC has a sawtooth shape formed by positive slope intervals 332 and off intervals 334. In some examples, each of the positive slope intervals 332 corresponds to CS_S1 having a first state (e.g., an asserted state in FIG. 3B), and each of the off intervals 334 corresponds to CS_S1 having a second state (e.g., a de-asserted state in FIG. 3B). The slope 338 of I_ASC during each of the positive slope intervals 332 may vary and is controlled by the current provided by the adjustable current source circuitry 314. In some examples, the current provided by the adjustable current source circuitry 314 varies responsive to the input parameters. During each of the positive slope intervals 332, CS_S1 turns the switch S1 off and I_ASC increases as the capacitor C_SC is charged by the current provided by the adjustable current source circuitry 314, resulting in I_ASC reaching a threshold or maximum current level 336 for each of the positive slope intervals 332. During each of the off intervals 334, CS_S1 turns the switch S1 on and I_ASC decreases due to the capacitor C_SC being discharged to ground.

Figure 4:
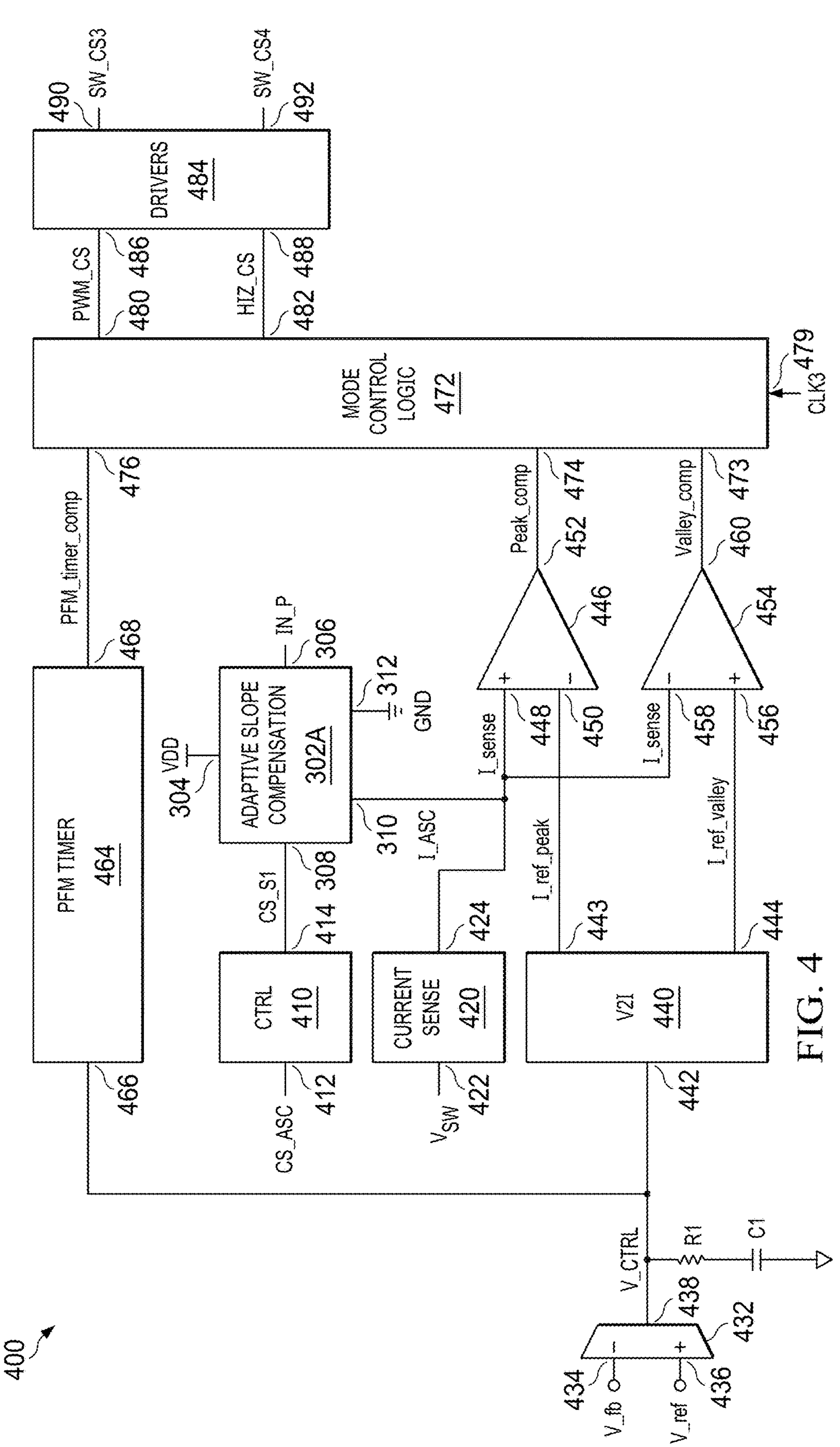
FIG. 4 is a diagram of an example switching converter controller.

FIG. 4 is a diagram of an example switching converter controller 400. The switching converter controller 400 is an example of the controller 148 of FIG. 1, or the controller 248 of FIG. 2. As shown, the switching converter controller 400 includes PFM timer circuitry 464, an error amplifier 432, a resistor R1, a capacitor C1, a voltage-to-current converter 440, current sense circuitry 420, adaptive slope compensation circuitry 302, a slope compensation controller 410, a peak comparator 446, a valley comparator 454, mode control logic 472, and driver circuitry 484. The adaptive slope compensation circuitry 302 is an example of the adaptive slope compensation circuitry 168 in FIG. 1, the adaptive slope compensation circuitry 268 in FIG. 2, or the adaptive slope compensation circuitry 302 in FIG. 3A. The PFM timer circuitry 464 is an example of the PFM timer circuitry 164 in FIG. 1 and/or the PFM timer circuitry 264 in FIG. 2. The driver circuitry 484 is an example of the driver circuitry 184 in FIG. 1 and/or the driver circuitry 284 in FIG. 2.

In the example of FIG. 4, the error amplifier 432, the voltage-to-current converter 440 and the peak comparator 446 are example components of the peak control circuitry 160 in FIG. 1 and/or the peak control circuitry 260 in FIG. 2. The error amplifier 432, the voltage-to-current converter 440 and the valley comparator 454 are example components of the valley control circuitry 155 in FIG. 1 and/or the valley control circuitry 255 in FIG. 2.

The error amplifier 432 has a first (inverting or "–") terminal 434, a second (non-inverting or "+") terminal 436, and a third terminal 438. The voltage-to-current converter 442 has a first terminal 442, a second terminal 443, and a third terminal 444. The current sense circuitry 420 has a first terminal 422 and a second terminal 424. The adaptive slope compensation circuitry 302 has the first terminal 304, the second terminal 306, the third terminal 308, the fourth terminal 310, and the fifth terminal 312 described in FIG. 3. The slope compensation controller 410 has a first terminal 412 and a second terminal 414. The peak comparator 446 has a first (non-inverting or "+") terminal 448, a second (inverting or "−") terminal 450, and a third terminal 452. The valley comparator 456 has a first (non-inverting or "+") terminal 456, a second (inverting or "−") terminal 458, and a third terminal 460. The mode control logic 472 has a first terminal 473, a second terminal 474, a third terminal 476, a fourth terminal 479, a fifth terminal 480, and a sixth terminal 482. The driver circuitry 484 has a first terminal 486, the second terminal 488, the third terminal 490, and a fourth terminal 492.

The first terminal 434 of the error amplifier 432 is coupled to an output terminal of a power stage (e.g., the third terminal 112 of the power stage 106 in FIG. 1, or the third terminal 212 of the power stage 206 in FIG. 2) and receives VOUT as a feedback voltage (V_fb). As another option, V_fb may be scaled version of VOUT (e.g., using a voltage divider). The second terminal 436 of the error amplifier 432 is coupled to a reference voltage source (not shown) and receives a reference voltage (V_ref). The third terminal 438 of the error amplifier 432 is coupled to the first terminal of the resistor R1 and to the first terminal 442 of the voltage-to-current converter 440. The second terminal of the resistor R1 is coupled to the first terminal of the capacitor C1. The second terminal of the capacitor C1 is coupled to ground or a ground terminal. The second terminal 443 of the voltage-to-current converter 440 is coupled to the second terminal 450 of the peak comparator 446. The first terminal 448 of the peak comparator 446 is coupled to the second terminal 424 of the current sense circuitry 420 and the fourth terminal 310 of the adaptive slope compensation circuitry 302. In some examples, the first terminal 422 of the current sense circuitry 420 is coupled to the fourth terminal 114 of the power stage 106 in FIG. 1, the fourth terminal 214 of the power stage 206 in FIG. 2, or related sense circuitry configured to monitor $V_{SW}$ or a related current. The third terminal 444 of the voltage-to-current converter 440 is coupled to the first terminal 456 of the valley comparator 454. The second terminal 458 of the valley comparator 454 is coupled to the second terminal 424 of the current sense circuitry 420 and the fourth terminal 310 of the adaptive slope compensation circuitry 302. As shown, the first terminal 304 of the adaptive slope compensation circuitry 302 is coupled to a VDD source. The second terminal of the adaptive slope compensation circuitry 302 receives input parameters IN_P. The third terminal 308 of the adaptive slope compensation circuitry 302 is coupled to the second terminal 414 of the slope compensation controller 410. The first terminal 412 of the slope compensation controller 410 receives an adaptive slope compensation control signal (CS_ASC).

The first terminal 473 of the mode control logic 472 is coupled to third terminal 460 of the valley comparator 454. The second terminal 474 of the mode control logic 472 is coupled to the third terminal 452 of the peak comparator 446. The third terminal 476 of the mode control logic 472 is coupled to the second terminal 468 of the PFM timer circuitry 464. The fourth terminal 479 of the mode control logic 472 is coupled to a clock generator and receives a clock signal (CLK3). The fifth terminal 480 of the mode control logic 472 is coupled to the first terminal 486 of the driver circuitry 484. The sixth terminal 482 of the mode control logic 472 is coupled to the second terminal 488 of the driver circuitry 484. The third terminal 490 of the driver circuitry 484 is a coupled to a control terminal of a first switch (e.g., the high-side switch 120 in FIG. 1, or the first switch 228 in FIG. 2). The fourth terminal 492 of the driver circuitry 484 is a coupled to a control terminal of a second switch (e.g., the low-side switch 128 in FIG. 1, or the second switch 236 in FIG. 2).

The error amplifier 432 is configured to: receive V_fb at the first terminal 434; receive V_ref at the second terminal 436; and provide V_CTRL at the third terminal 438 responsive to V_fb and V_ref. The value of V_CTRL is based on the difference between V_fb and V_ref as well as the value of the resistor R1 and the value of the capacitor C1, which form compensation circuitry for the control loop. Specifically, R1 and C1 convert error amplifier current to voltage based on proportional integrator (PI) control. The transconductance of the error amplifier 432 defines the gain applied when converting the voltage error at the input of the error amplifier 432 to an output current. The voltage-to-current converter 440 is configured to: receive V_CTRL at the first terminal 442; provide a peak reference current (I_ref_peak) at the second terminal 443 responsive to V_CTRL; and provide a valley reference current (I_ref_valley) at the third terminal 444 responsive to V_CTRL. In some examples, voltage-to-current converter 440 converts V_CTRL to I_ref_valley based on a given transconductance in the PWM mode. If the PFM mode, the voltage-to-current converter 440 sets I_ref_valley to zero. In some examples, the voltage-to-current converter 440 may convert V_CTRL to I_ref_peak using the given transconductance. In some examples, I_ref_valley and/or I_ref_peak generation is also based on a hysteresis current, which defines the difference between the valley and peak levels. In the PWM mode, the hysteresis current may be a predefined value (e.g., relative to a fixed current level). In the PFM mode, the hysteresis current may be relative to the inductor current ripple in the PWM mode.

The peak comparator 446 is configured to: receive I_sense (compensated by I_ASC) at the first terminal 448; receive I_ref_peak at the second terminal 450; and provide a peak compare result (Peak_comp) at the third terminal 452 responsive to I_sense (compensated by I_ASC) and I_ref_peak. The valley comparator 454 is configured to: receive I_ref_peak at the first (non-inverting) terminal 456; receive I_sense (compensated by I_ASC) at the second (inverting) terminal 458; and provide a comparison result Valley_comp at the third terminal 460 responsive to I_sense (compensated by I_ASC) and I_ref_valley. The PFM timer circuitry 464 is configured to: receive V_CTRL at the first terminal 466; and provide a PFM timer control signal (PFM_timer_comp) responsive to V_CTRL and possible a PFM mode signal.

The mode control logic 472 is configured to: receive Valley_comp at the first terminal 473; receive Peak_comp at the second terminal 474; receive PFM_timer_comp at the third terminal 476; receive CLK3 at the fourth terminal 479; control a PWM control signal (PWM_CS) state at the fifth terminal 480 responsive to Valley_comp, Peak_comp, CLK3, PFM_timer_comp, and/or a current mode; and provide a high impedance (HIZ) control signal (HIZ_CS) at the sixth terminal 482 responsive to Valley_comp, Peak_comp, PFM_timer_comp and/or a current mode.

In some examples, the mode control logic 472 is configured to control the state of PWM_CS at the fifth terminal 480 and the state of HIZ_CS at the sixth terminal 482 during PWM mode operations and during PFM mode operations of the switching converter controller 400. In some examples, during a PWM mode, the mode control logic 472 is configured to maintain HIZ_CS in a second state (e.g., a de-asserted or logical low state). With HIZ_CS in the second state, PWM_CS controls the state of HS_CS and LS_CS during the PWM mode to support HS intervals and LS intervals. During the PWM mode, PWM_CS may be asserted responsive to Valley_comp or Peak_comp being asserted (indicating the current of an inductor has reached a threshold) and may be de-asserted responsive to a timer, a clock signal, Valley_comp being asserted or Peak_comp being asserted (indicating the current of the inductor has reached a threshold). For each HS interval, HS_CS may be asserted while LS_CS is de-asserted. For each LS interval, HS_CS may be de-asserted while LS_CS is asserted. The duration of the HS interval relative to the LS interval for each cycle defines a duty cycle provided by the switching converter controller 400. For example, if the HS interval and the LS interval are equal in duration, the duty cycle provided by the switching converter controller 400 is 50%.

In response to a light load condition, the mode control logic 472 is configured to transition from the PWM mode to a PFM mode. During the PFM mode, the mode control logic 472 is configured to support PFM mode operations, including asserting HIZ_CS as needed to provide a pause between HS intervals and LS intervals during the PFM mode.

Responsive to detecting a light load condition, the mode control logic 472 initiates a transition from the PWM to a PFM mode. In some examples, the light load condition may be detected using a comparator (not shown) to detect when V_CTRL drops below V_valley_zero (indicating the valley current level is below zero). As another option, a host system may provide a control signal (e.g., a low-power request) that triggers a transition from the PWM mode to the PFM mode.

During a PFM mode, the mode control logic 472 is configured to assert HIZ_CS as needed between PFM pulses to enable pause intervals (e.g., both of the HS switch 120 and the LS switch 128 are turned off during each pause interval) between HS intervals and LS intervals. Also, during the PFM mode, PFM_pulse_comp may be asserted to initiate a PFM pulse (a HS interval) when HIZ_CS is de-asserted and PWM_CS is asserted. During the PFM mode, Peak_comp being asserted may initiate an LS interval when PWM_CS is de-asserted. During the PFM mode, Valley_comp may be used to detect zero current and trigger assertion of HIZ_CS.

The driver circuitry 484 is configured to receive PWM_CS at the first terminal 486; receive HIZ_CS at the second terminal 488; provide HS_CS with a first state (e.g., HS_CS asserted) at the third terminal 190 and LS_CS with a second state (e.g., LS_CS de-asserted) at the fourth terminal 492 responsive to PWM_CS having a first state (e.g., PWM_CS asserted) and HIZ_CS having a second state (e.g., HIZ_CS de-asserted); provide HS_CS with a second state (e.g., HS_CS de-asserted) at the third terminal 490 and LS_CS with a first state (e.g., LS_CS asserted) at the fourth terminal 492 responsive to PWM_CS having a second state (e.g., PWM_CS de-asserted) and HIZ_CS having a second state (e.g., HIZ_CS de-asserted); and provide HS_CS with a second state (e.g., HS_CS de-asserted) at the third terminal 490 and LS_CS with a second state (e.g., LS_CS de-asserted) at the fourth terminal 492 responsive to HIZ_CS having a first state (e.g., HIZ_CS asserted).

With the adaptive slope compensation circuitry 302, the slope 338 of a slope compensation ramp provided by the adaptive slope compensation circuitry 302 accounts for variance in the input parameters, which improves the accuracy of the I_sense ramp used by the peak comparator 446 and/or the valley comparator 454 and related control operations. With improved slope compensation, the control loop is more accurate resulting in benefits such as reduced VOUT ripple.

Figure 5:
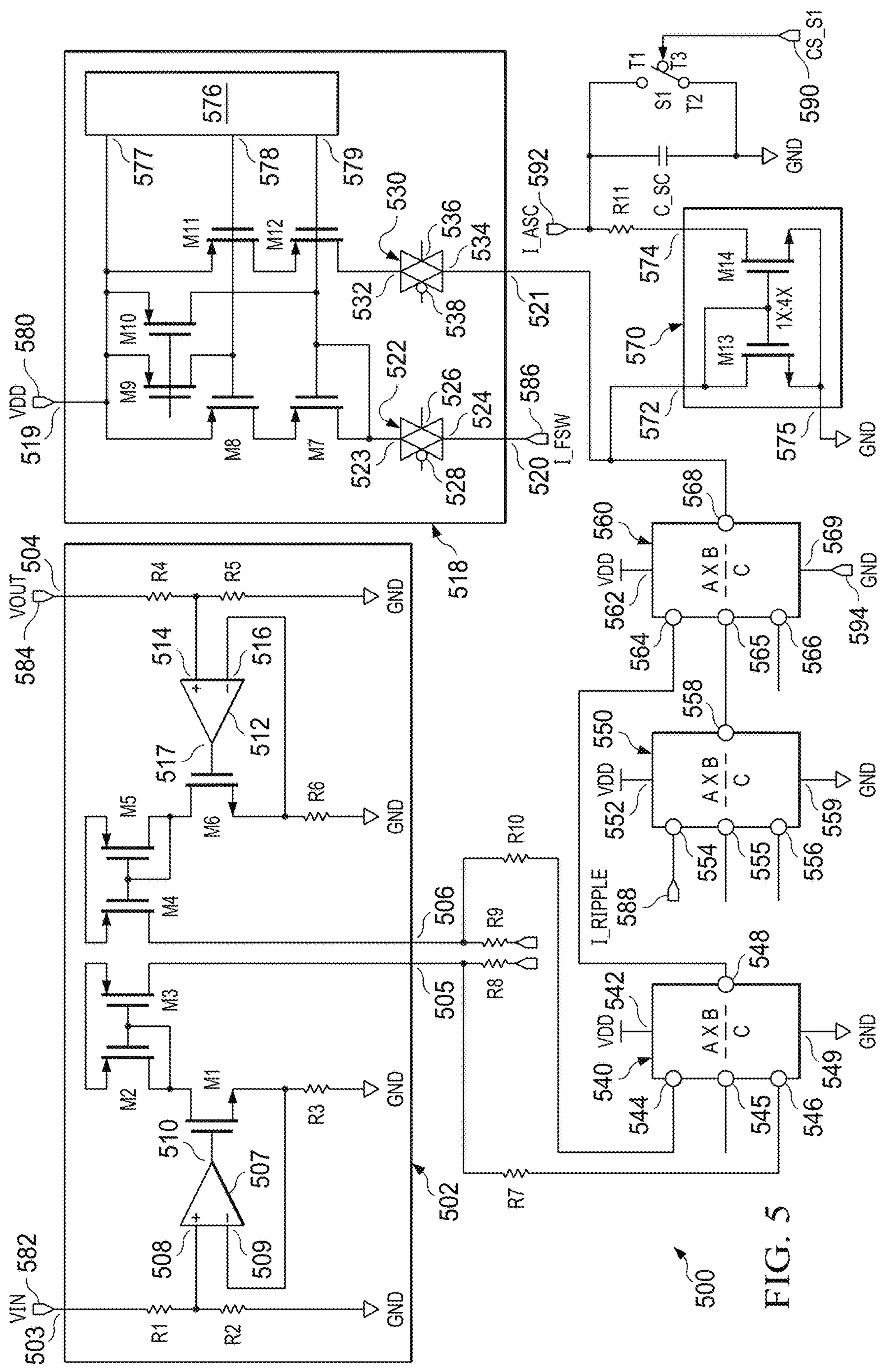
FIG. 5 is a schematic diagram of example adaptive slope compensation circuitry.

FIG. 5 is a schematic diagram of example adaptive slope compensation circuitry 500. The adaptive slope compensation circuit 500 is an example of the adaptive slope compensation circuitry 302 in FIG. 3A, or the adaptive slope compensation circuitry 302 in FIG. 4. As shown, the adaptive slope compensation circuitry 500 has a first terminal 580, a second terminal 582, a third terminal 584, a fourth terminal 586, a fifth terminal 588, a sixth terminal 590, a seventh terminal 592, and an eighth terminal 594. The first terminal 580 is an example of the first terminal 304 in FIGS. 3A and 4. The second terminal 582, the third terminal 584, the fourth terminal 586, and the fifth terminal 588 are examples of the second terminal 306 in FIGS. 3A and 4. The sixth terminal 590 is an example of the third terminal 308 in FIGS. 3A and 4. The seventh terminal 592 is an example of the fourth terminal 310 in FIGS. 3A and 4. The eighth terminal 594 is an example of the fifth terminal 312 in FIGS. 3A and 4.

In the example of FIG. 5, the adaptive slope compensation circuitry 500 includes voltage-to-current converter circuitry 502, current scaling circuitry 518, multipliers 540, 550, 560, a current mirror 570, resistors R7 to R11, the capacitor C_SC, and the switch S1 in the arrangement shown. The voltage-to-current converter circuitry 502 has a first terminal 503, a second terminal 504, a third terminal 505, and a fourth terminal 506. The current scaling circuitry 518 has a first terminal 519, a second terminal 520, and a third terminal 521. The multiplier 540 has a first terminal 542, a second terminal 544, a third terminal 545, a fourth terminal 546, a fifth terminal 548, and a sixth terminal 549. The multiplier 550 has a first terminal 552, a second terminal 554, a third terminal 555, a fourth terminal 556, a fifth terminal 558, and a sixth terminal 559. The multiplier 560 has a first terminal 562, a second terminal 564, a third terminal 565, a fourth terminal 566, a fifth terminal 568, and a sixth terminal 569. The current mirror 570 has a first terminal 572, a second terminal 574, and a third terminal 575. Each of the resistors R7 to R11 has a respective first terminal and a respective second terminal.

In the example of FIG. 5, the first terminal 580 of the adaptive slope compensation circuitry 500 is coupled to the first terminal 519 of the current scaling circuitry 518. The second terminal 582 of the adaptive slope compensation circuitry 500 is coupled to second terminal 504 of the voltage-to-current converter circuitry 502. The third terminal 584 of the adaptive slope compensation circuitry 500 is coupled to first terminal 503 of the voltage-to-current converter circuitry 502. The fourth terminal 586 of the adaptive slope compensation circuitry 500 is coupled to the second terminal 520 of the current scaling circuitry 518. The fifth terminal 588 of the adaptive slope compensation circuitry 500 is coupled to the second terminal of the multiplier 550. The sixth terminal 590 of the adaptive slope compensation circuitry 500 is coupled to the control terminal T3 of the switch S1. The seventh terminal 592 of the adaptive slope compensation circuitry 500 is coupled to first terminal of the resistor R11, the first terminal of the capacitor C_SC, and the first terminal T1 of the switch S1. The eighth terminal 594 of the adaptive slope compensation circuitry 500 is coupled to ground or a ground terminal.

In the example of FIG. 5, the voltage-to-current converter circuitry 502 includes resistors R1 to R6, operational amplifiers 507 and 512, and transistors M1 to M6 in the arrangement shown. Each of the resistors R1 to R6 has respective first and second terminals. The operational amplifier 507 has a first terminal 508, a second terminal 509, and a third terminal 510. The operational amplifier 512 has a first terminal 514, a second terminal 516, and a third terminal 517. 512. Each of the transistors M1 to M6 has a respective first terminal, a respective second terminal, and a respective control terminal.

The first terminal of the resistor R1 is coupled to the first terminal 503 of the voltage-to-current converter circuitry 502. The second terminal of the resistor R2 is coupled to the first terminal of the resistor R2 and to the first (non-inverting or "+") terminal 508 of the operational amplifier 507. The second terminal of the resistor R2 is coupled to ground or a ground terminal. The third terminal 510 of the operational amplifier 507 is coupled to the control terminal of the transistor M1. The first terminal of the transistor M1 is coupled to the second terminal of the transistor M2 and to the control terminals of the transistors M2 and M3. The second terminal of the transistor M1 is coupled to the first terminal of the resistor R3 and to the second (inverting or "−") terminal 509 of the operational amplifier 507. The second terminal of the resistor R3 is coupled to ground or a ground terminal. The first terminal of the transistor M2 is coupled to the first terminal of the transistor M3. The second terminal of the transistor M3 is coupled to the third terminal 505 of the voltage-to-current converter circuitry 502.

Figure 6:
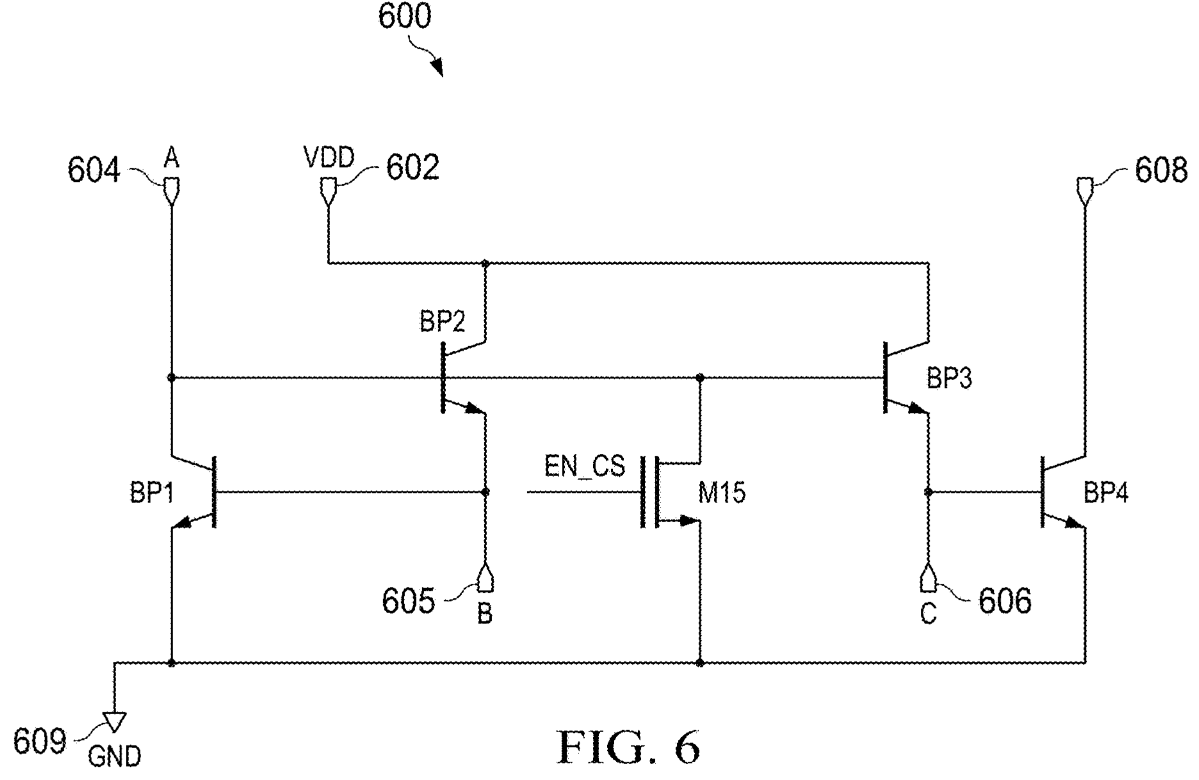
FIG. 6 is a schematic diagram of an example 4-quadrant multiplier.

The first terminal of the resistor R4 is coupled to the second terminal 504 of the voltage-to-current converter circuitry 502. The second terminal of the resistor R4 is coupled to the first terminal of the resistor R5 and to the first (non-inverting or "+") terminal 514 of the operational amplifier 512. The second terminal of the resistor R5 is coupled to ground or a ground terminal. The third terminal 517 of the operational amplifier 512 is coupled to the control terminal of the transistor M6. The first terminal of the transistor M6 is coupled to the second terminal of the transistor M5 and to the control terminals of the transistors M5 and M5. The second terminal of the transistor M6 is coupled to the first terminal of the resistor R6 and to the second (inverting or "−") terminal 516 of the operational amplifier 512. The second terminal of the resistor R6 is coupled to ground or a ground terminal. The first terminal of the transistor M4 is coupled to the first terminal of the transistor M5. The second terminal of the transistor M4 is coupled to the fourth terminal 506 of the voltage-to-current converter circuitry 502. In the example of FIG. 6, the transistors M1 and M6 are n-channel metal oxide semiconductor (NMOS) transistors, and the transistors M2 to M5 are p-channel metal oxide semiconductor (PMOS) transistors. In other examples, the type of transistor used for the voltage-to current converter 502 may vary.

The first terminals of the resistors R7 and R8 are coupled to the third terminal 505 of the voltage-to-current converter circuitry 502. The second terminal of the resistor R7 is coupled to the fourth terminal 546 of the multiplier 540. The first terminals of the resistors R9 and R10 are coupled to the fourth terminal 506 of the voltage-to-current converter circuitry 502. The second terminal of the resistor R10 is coupled to the second terminal 544 of the multiplier 540.

The first terminal 542 of the multiplier 540 is coupled to a VDD source. The third terminal 545 of the multiplier 540 is not used in the example of FIG. 5. The fifth terminal 548 of the multiplier 540 is coupled to the second terminal 564 of the multiplier 560. The sixth terminal 549 of the multiplier 540 is coupled to ground or a ground terminal. The first terminal 552 of the multiplier 550 is coupled to a VDD source. The second terminal 554 of the multiplier 550 is coupled to the fifth terminal 588 of the adaptive slope compensation circuitry 500 and receives a ripple current (I_RIPPLE) signal. The third terminal 555 and the fourth terminal 556 of the multiplier 550 are not used in the example of FIG. 5. The fifth terminal 558 of the multiplier 550 is coupled to the third terminal 565 of the multiplier 560. The sixth terminal 559 of the multiplier 550 is coupled to ground or a ground terminal. The first terminal 562 of the multiplier 560 is coupled to a VDD source. The fourth terminal 566 of the multiplier 560 is not used in the example of FIG. 5. The fifth terminal 568 of the multiplier 560 is coupled to the third terminal 521 of the current scaling circuitry 518 and the first terminal 572 of the current mirror 570. The sixth terminal 569 of the multiplier 560 is coupled to ground or a ground terminal.

The first terminal of the resistor R11 is coupled to the seventh terminal 592 of the adaptive slope compensation circuitry 500, the first terminal of the of the capacitor C_SC, and the first terminal T1 of the switch S1. The second terminal of the resistor R11 is coupled to the second terminal 574 of the current mirror 570. The third terminal 575 of the current mirror 570 is coupled to ground or a ground terminal. The second terminal of the capacitor C_SC is coupled to ground or a ground terminal. The second terminal T2 of the switch S1 is coupled ground or a ground terminal. The control terminal T3 of the switch S1 is coupled to the sixth terminal 590 of the adaptive slope compensation circuitry 500.

In the example of FIG. 5, the current scaling circuitry 518 includes transistors M7 to M12, transmission gates 522 and 530, and scaling circuitry 576 in the arrangement shown. The scaling circuitry 576 has a first terminal 577, a second terminal 578, and a third terminal 579. Each of the transistors M7 to M12 has a respective first terminal, a respective second terminal, and a respective control terminal. The transmission gate 522 has a first terminal 523, a second terminal 524, a third terminal 526, and a fourth terminal 528. The transmission gate 530 has a first terminal 532, a second terminal 534, a third terminal 536, and a fourth terminal 538. Without limitation, the transistors M7 to M12 are PMOS transistors in the example of FIG. 5

The first terminals of the transistors M8, M9, M10, and M11 are coupled to the first terminal 519 of the current scaling circuitry 518. The second terminal of the transistor M8 is coupled to the first terminal of the transistor M7. The second terminal of the transistor M7 is coupled to the first terminal 523 of the transmission gate 522. The second terminal 524 of the transmission gate 522 is coupled to the second terminal 520 of the current scaling circuitry 518. The second terminal of the transistor M9 is coupled to the control terminals of the transistor M8 and M11 and the second terminal 578 of the scaling circuitry 576. The second terminal of the transistor M10 is coupled to the control terminals M7 and M12 and to the third terminal 579 of the scaling circuitry 576. The second terminal of transistor M11 is coupled to the first terminal of the transistor M12. The second terminal of the transistor M12 is coupled to the first terminal 532 of the transmission gate 530. The second terminal 534 of the transmission gate 530 is coupled to the fifth terminal 568 of the multiplier 560 and the first terminal 572 of the current mirror 570.

In the example of FIG. 5, the current mirror 570 includes transistors M13 and M14 in the arrangement shown. Without limitation, the transistors M13 and M14 are NMOS transistors in the example of FIG. 5. Each of the transistors M13 and M13 has a respective first terminal, a respective second terminal, and a respective control terminal. The first terminal of the transistor M13 is coupled to the first terminal 572 of the current mirror 570. The control terminals of the transistors M13 and M14 are also coupled to the first terminal 572 of the current mirror. The first terminal of the transistor M14 is coupled to the second terminal 574 of the current mirror 570. The second terminals of the transistors M13 and M14 are coupled to the third terminal 575 of the current mirror 570. Without limitation, the transistor M14 is sized 4:1 relative to M13.

In some examples, the adaptive slope compensation circuitry 500 is configured to: receive VDD at the first terminal 580; receive VIN at the second terminal 582; receive VOUT at the third terminal 584; receive the switch frequency value I_FSW at the fourth terminal 586; receive the current ripple metric I_RIPPLE at the fifth terminal 588; and provide a slope compensation current I_ASC at the seventh terminal 592 responsive to VIN, VOUT, I_FSW, and I_RIPPLE. In other examples, the input parameters used to determine the slope compensation current I_ASC may vary. The adaptive slope compensation circuitry 500 is also configured to: receive CS_S1 at the sixth terminal 590; charge the capacitor C_SC based on the slope compensation current I_ASC responsive to CS_S1 having a first state (e.g., an asserted or logical "1" state); and discharge the capacitor C_SC responsive to CS_S1 having a second state (e.g., a de-asserted or logical "0" state). In some examples, the adaptive slope compensation circuitry 500 is configured to charge and discharge the capacitor C_SC responsive to CS_S1 and I_ASC such that the slope compensation current has a sawtooth pattern and the I_ASC ramp slope (e.g., slope 338) is 0.5× to 1.0× of the current sense ramp.

More specifically, the voltage-to-current converter circuitry 502 is configured to: receive VIN at the first terminal 503; receive VOUT at the second terminal 504; provide a VIN current value based on VIN at the third terminal 505; and provide a VOUT current value based on VOUT at the fourth terminal 506. The resistors R7 and R8 form a first scaling circuit to scale the VIN current value, which is provided to the fourth terminal 546 of the multiplier 540. The resistors R9 and R10 form a second scaling circuit to scale the VOUT current value, which is provided to the second terminal 544 of the multiplier 540. The multiplier 540 is configured to: receive VDD at the first terminal 542; receive the VOUT value at the second terminal 544; receive the VIN value at the fourth terminal 546; and provide a VOUT/VIN value at the fifth terminal 548 responsive to the VOUT value and the VIN value. The multiplier 550 is configured to: receive VDD at the first terminal 552; receive I_RIPPLE at the second terminal 554; and provide the I_RIPPLE value at the fifth terminal 558. The multiplier 560 is configured to: receive VDD at the first terminal 562; receive the VOUT/VIN value at the second terminal 564; receive the I_RIPPLE value at the third terminal 565; and provide (VOUT/VIN)*I_RIPPLE at the fifth terminal 568 responsive to the I_RIPPLE value and the VOUT/VIN value.

The current scaling circuitry 518 is configured to: receive VDD at the first terminal 519; receive an I_FSW value at the second terminal 520; and provide a scaled I_FSW value at the third terminal 521 responsive to the I_FSW value and the operations of the current scaling circuitry 518. In some examples, the current scaling circuitry 518 may scale the I_FSW value by an integer such as 2 or 4. The scaled I_FSW value is combined with (VOUT/VIN)*I_RIPPLE and the combined current is provided to the current mirror 570. The current mirror 570 is configured to: receive the combined current at the first terminal 572; and provide a scaled version of the combined current at the second terminal 574 based on a size relationship of the transistor M13 and M14. In some examples, M14 is sized relative to M13 such that the scaled version of the combined current is 4 times the combined current. The scaled combined current charges the capacitor C_SC via the resistor R11 when the switch S1 is turned off by CS_S1. When the switch S1 is turned on by CS_S1, the charge on the capacitor C_SC returns to ground.

FIG. 6 is a schematic diagram of an example 4-quadrant multiplier 600. The 4-quadrant multiplier 600 is an example of each of the multipliers 540, 550, and 560 in FIG. 5. In the example of FIG. 6, the 4-quadrant multiplier 600 has a first terminal 602, a second terminal 604, a third terminal 605, a fourth terminal 606, a fifth terminal 608, and a sixth terminal 609. The first terminal 602 of the 4-quadrant multiplier 600 is an example of the first terminal 542 of the multiplier 540, the first terminal 552 of the multiplier 550, or the first terminal 562 of the multiplier 560 in FIG. 5. The second terminal 604 of the 4-quadrant multiplier 600 is an example of the second terminal 544 of the multiplier 540, the second terminal 554 of the multiplier 550, or the second terminal 564 of the multiplier 560 in FIG. 5. The third terminal 605 of the 4-quadrant multiplier 600 is an example of the third terminal 545 of the multiplier 540, the third terminal 555 of the multiplier 550, or the third terminal 565 of the multiplier 560 in FIG. 5. The fourth terminal 606 of the 4-quadrant multiplier 600 is an example of the fourth terminal 546 of the multiplier 540, the fourth terminal 556 of the multiplier 550, or the fourth terminal 566 of the multiplier 560 in FIG. 5. The fifth terminal 608 of the 4-quadrant multiplier 600 is an example of the fifth terminal 548 of the multiplier 540, the fifth terminal 558 of the multiplier 550, or the fifth terminal 568 of the multiplier 560 in FIG. 5. The sixth terminal 609 of the 4-quadrant multiplier 600 is an example of the sixth terminal 549 of the multiplier 540, the sixth terminal 559 of the multiplier 550, or the sixth terminal 569 of the multiplier 560 in FIG. 5.

In the example of FIG. 6, the 4-quadrant multiplier 600 includes transistors BP1 to BP4 and transistor M15 in the arrangement shown. In some examples, the transistors BP1 to BP4 are bipolar transistors, while the transistor M15 is an NMOS transistor. Each of the transistor BP 1 to BP 4 and the transistor M14 has a respective first terminal, a respective second terminal, and a control terminal. As shown, the first terminal of the transistor BP1 is coupled to the second ("A") terminal 604 of the 4-quadrant multiplier 600. The second terminal of the transistor BP1 is coupled to the sixth terminal 609 of the 4-quadrant multiplier 600. The control terminal of the transistor BP1 is coupled to the third ("B") terminal 605 of the 4-quadrant multiplier 600. The first terminals of the transistors BP2 and BP3 are coupled to the first terminal 602 of the 4-quadrant multiplier 600. The second terminal of the transistor BP2 is coupled to the third ("B") terminal 605 of the 4-quadrant multiplier 600. The second terminal of the transistor BP3 is coupled to the fourth ("C") terminal 606 of the 4-quadrant multiplier 600. The control terminal of the transistor BP2 and BP3 are coupled to the second ("A") terminal 604 of the 4-quadrant multiplier 600. The first terminal of the transistor M15 is coupled to the second ("A") terminal 604 of the 4-quadrant multiplier 600. The second terminal of the transistor M15 is coupled to the sixth terminal 609 of the 4-quadrant multiplier 600. The control terminal of the transistor M15 receives an enable control signal (EN_CS). In some examples, the transistor M15 and EN_CS may be omitted. The first terminal of the transistor BP4 is coupled to the fifth terminal 608 of the 4-quadrant multiplier 600. The second terminal of the transistor BP4 is coupled to the sixth terminal 609 of the 4-quadrant multiplier 600. The control terminal of the transistor MP4 is coupled to the fourth terminal 606 of the 4-quadrant multiplier 600.

In operation, the 4-quadrant multiplier 600 is configured to: receive VDD at the first terminal 602; receive a first ("A") value at the second ("A") terminal 604; receive a second ("B") value at the third ("B") terminal 605; receive a third ("C") value at the fourth ("C") terminal 606; and provide an output $$\frac{A \times B}{C}$$

at the fifth terminal 608. If the A value is omitted and B and C values are provided, the 4-quadrant multiplier 600 outputs $$\frac{B}{C}$$

at the fifth terminal 608. If the A and C values are provided and the B value is omitted, the 4-quadrant multiplier 600 outputs $$\frac{A}{C}$$

at the fifth terminal 608. If the A and B values are provided and the C value is omitted, the 4-quadrant multiplier 600 outputs A×B at the fifth terminal 608, and so on.

Figure 7A:
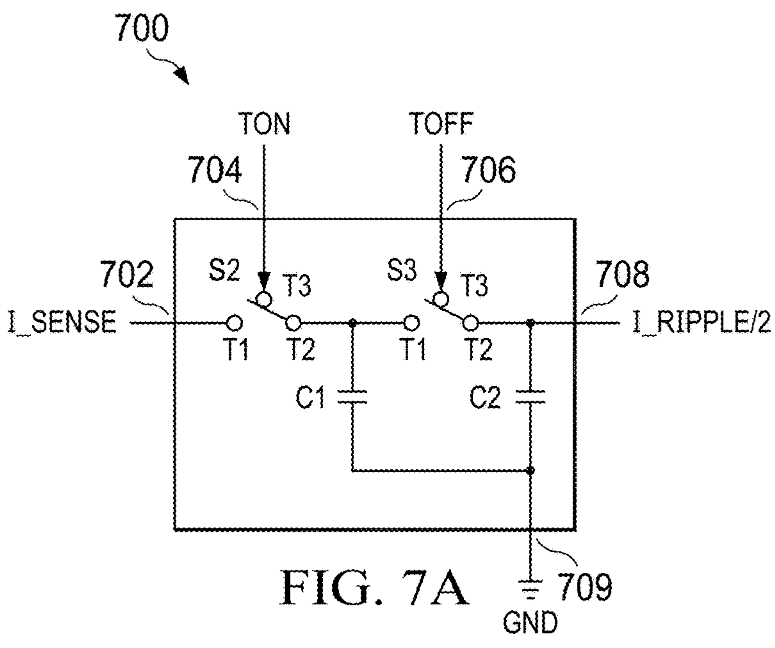
FIG. 7A is a schematic diagram of an example current ripple tracker circuit.

FIG. 7A is a schematic diagram of an example current ripple tracker circuit 700. The current ripple tracker circuit 700 is used to provide I_RIPPLE/2, which may be used as an input parameter by adaptive slope compensation circuitry (e.g., the adaptive slope compensation circuitry 302 in FIG. 3, the adaptive slope compensation circuitry 302 in FIG. 4, or the adaptive slope compensation circuitry 500 in FIG. 5). In some examples, the current ripple tracker circuit 700 may be included with the adaptive slope compensation circuitry. In the example of FIG. 7A, the current ripple tracker circuit 700 has a first terminal 702, a second terminal 704, a third terminal 706, a fourth terminal 708, and a fifth terminal 709.

In the example of FIG. 7A, the current ripple tracker circuit 700 includes a switch S2, a switch S3, a capacitor C1, and a capacitor C2 in the arrangement shown. Each of the switch S2 and the switch S3 has a respective first terminal T1, a respective second terminal T2, and a respective control terminal T3. Each of the capacitors C1 and C2 has a respective first terminal and a respective second terminal. The first terminal T1 of the switch S2 is coupled to the first terminal 702 of the current ripple tracker circuit 700. The second terminal T2 of the switch S2 is coupled to the first terminal of the capacitor C1 and the first terminal T1 of the switch S3. The control terminal T3 of the switch S2 is coupled to the second terminal 704 of the current ripple tracker circuit 700. The second terminal of the capacitor C1 is coupled to the fifth terminal 709 of the current ripple tracker circuit 700. The second terminal T2 of the switch S3 is coupled to the first terminal of the capacitor C2 and to the fourth terminal of the current ripple tracker circuit 700. The control terminal T3 of the switch S3 is coupled to the third terminal 706 of the current ripple tracker circuit 700. The second terminal of the capacitor C2 is coupled to the fifth terminal 709 of the current ripple tracker circuit 700.

The current ripple tracker circuit 700 is configured to: receive I_SENSE at the first terminal 702; receive an on-interval signal (TON) at the second terminal 704; receive an off-interval signal (TOFF) at the third terminal 706; and provide a current ripple metric (e.g., I_RIPPLE/2 value) responsive to I_SENSE, TON, and TOFF.

Figure 7B:
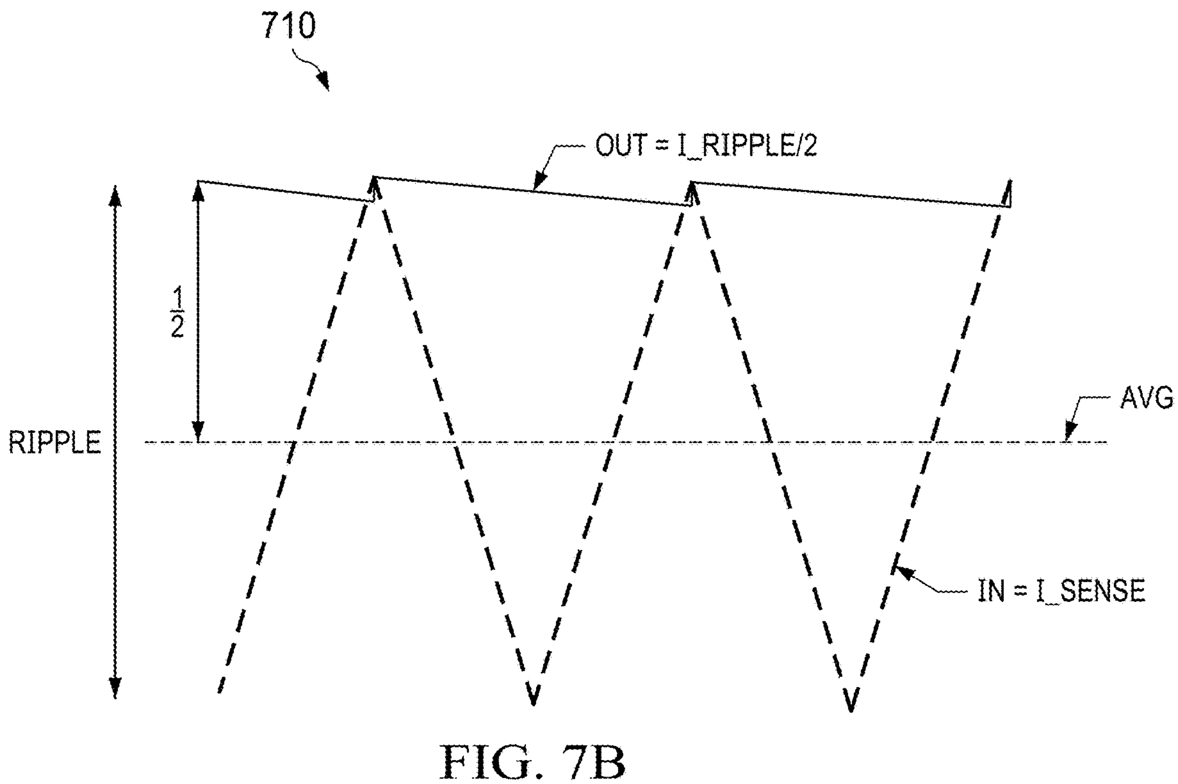
FIG. 7B is a diagram showing example current ripple tracking.

FIG. 7B is a diagram 710 showing example current ripple tracking performed by a current ripple tracker circuit (e.g., the current ripple tracker circuit 700 of FIG. 7A). In the diagram 710, I_SENSE ramps up and down and has an average value (AVG). In some examples, the current ripple metric output by a current ripple tracker circuit is equal to I_RIPPLE/2 relative to the average.

Figure 8:
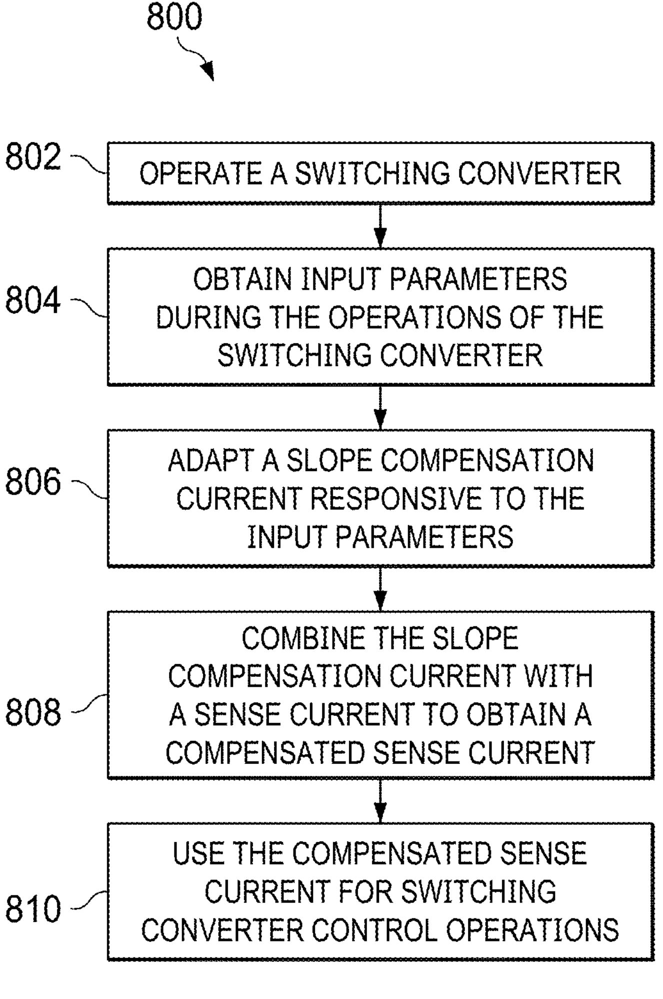
FIG. 8 is a flowchart showing an example adaptive slope compensation method.

FIG. 8 is a flowchart showing an adaptive slope compensation method 800. The adaptive slope compensation method 800 may be performed, for example, by a switching converter controller (e.g., the controller 148 in FIG. 1, the controller 248 in FIG. 2, or the switching converter controller 400 in FIG. 4). As shown, the adaptive slope compensation method 800 includes operating a switching converter at block 802. At block 804, input parameters are obtained during the operations of the switching converter. Example input parameters include, but are not limited to, VIN, VOUT, FSW, I_RIPPLE, C_SC and/or L. At block 806, a slope compensation current (e.g., I_ASC herein) is adapted responsive to the input parameters. In some boost converter and some buck converter examples, an adaptive slope compensation current may be a function of (VOUT/VIN) *FSW*I_RIPPLE*C_SC. At block 808, the slope compensation current is combined with a sense current to obtain a compensation sense current. At block 810, the compensated sense current is used for switching converter control operations. For example, the compensated sense current may affect when a current peak and/or a current valley is detected during switching converter control operations. Such switching converter control operations may be used to determine on intervals, off intervals, or pause intervals for switches of a power stage (e.g., the HS switch 120 and the LS switch 128 of the power stage 106 in FIG. 1, or the first switch 228 and the second switch 236 of the power stage 206 in FIG. 2).

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Also, in this description, the recitation "based on" means "based at least in part on." Therefore, if X is based on Y, then X may be a function of Y and any number of other factors.

A device "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component and/or a conductor.

A circuit or device described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors is described herein, other transistors (or equivalent devices) may be used instead with little or no change to the remaining circuitry. For example, a field-effect transistor ("FET") such as an NFET or a PFET, a bipolar junction transistor (BJT—e.g., NPN transistor or PNP transistor), an insulated gate bipolar transistor (IGBT), and/or a junction field effect transistor (JFET) may be used in place of or in conjunction with the devices described herein. The transistors may be depletion mode devices, drain-extended devices, enhancement mode devices, natural transistors or other types of device structure transistors. Furthermore, the devices may be implemented in/over a silicon substrate (Si), a silicon carbide substrate (SiC), a gallium nitride substrate (GaN) or a gallium arsenide substrate (GaAs).

References may be made in the claims to a transistor's control terminal and its first and second terminals. In the context of a FET, the control terminal is the gate, and the first and second terminals are the drain and source. In the context of a BJT, the control terminal is the base, and the first and second terminals are the collector and emitter.

References herein to a FET being "ON" means that the conduction channel of the FET is present and drain current may flow through the FET. References herein to a FET being "OFF" means that the conduction channel is not present so drain current does not flow through the FET. An "OFF" FET, however, may have current flowing through the transistor's body-diode.

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

While certain elements of the described examples are included in an integrated circuit and other elements are external to the integrated circuit, in other examples, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated circuit. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter or, if the parameter is zero, a reasonable range of values around zero.

Modifications are possible in the described examples, and other examples are possible, within the scope of the claims.

What is claimed is:

1. A system comprising:
- a power stage having a first terminal, a second terminal, a third terminal, and a fourth terminal; and
- a controller having a first terminal, a second terminal, a third terminal, a fourth terminal, and a fifth terminal, the first terminal of the controller coupled to the fourth terminal of the power stage, the second terminal of the controller coupled to the third terminal of the power stage, the third terminal of the controller coupled to the first terminal of the power stage, the fourth terminal of the controller coupled to the second terminal of the controller, the controller including an adaptive slope compensation circuit configured to:
- obtain input parameters;
- adjust a scaling factor responsive to the input parameters;
- adapt a slope compensation current responsive to the scaling factor; and
- output a slope compensation signal responsive to the adapted slope compensation current.

2. The system of claim 1, wherein the power stage is a boost converter, and the input parameters include an input voltage (VIN), an output voltage (VOUT), a current ripple metric (I_RIPPLE), and a switching frequency (FSW), and a slope compensation capacitance (C_SC).

3. The system of claim 2, wherein the adaptive slope compensation circuit is configured to adjust the scaling factor is a function of (VOUT/VIN) *FSW*I_RIPPLE*C_SC.

4. The system of claim 1, wherein the power stage is a buck converter, and the input parameters include an input voltage (VIN), an output voltage (VOUT), a current ripple metric (I_RIPPLE), and a switching frequency (FSW), and a slope compensation capacitance (C_SC).

5. The system of claim 4, wherein the adaptive slope compensation circuit is configured to adjust the scaling factor based as a function of (VIN/VOUT) *FSW*I_RIPPLE*C_SC.

6. The system of claim 1, wherein the adaptive slope compensation circuit has a first terminal, a second terminal, a third terminal, a fourth terminal, and a fifth terminal, the first terminal of the adaptive slope compensation circuit adapted to receive a first input parameter, the second terminal of the adaptive slope compensation circuit adapted to receive a second input parameters, the third terminal of the adaptive slope compensation circuit adapted to receive a third input parameter, the fourth terminal of the adaptive slope compensation circuit adapted to receive a fourth input parameter.

7. The system of claim 6, wherein the adaptive slope compensation circuit includes adjustable current source circuitry having a first terminal, a second terminal, a third terminal, a fourth terminal, and a fifth terminal, the first terminal of the adjustable current source circuitry coupled to the first terminal of the adaptive slope compensation circuit, the second terminal of the adjustable current source circuitry coupled to the second terminal of the adaptive slope compensation circuit, the third terminal of the adjustable current source circuitry coupled to the third terminal of the adaptive slope compensation circuit, the fourth terminal of the adjustable current source circuitry coupled to the fourth terminal of the adaptive slope compensation circuit.

8. The system of claim 7, wherein the adaptive slope compensation circuit includes:

a capacitor having a first terminal and second terminal; and a switch having a first terminal, a second terminal, and a control terminal, the first terminal of the capacitor coupled to the fifth terminal of the adjustable current source circuitry and to the first terminal of the switch, the second terminal of the switch coupled to the fifth terminal of the adaptive slope compensation circuit.

9. The system of claim 8, wherein the adaptive slope compensation circuit includes 4-quadrant multipliers.

10. A switching converter controller comprising:

current sense circuitry having a first terminal and a second terminal;

adaptive slope compensation circuitry having a first terminal and a second terminal, the second terminal of the adaptive slope compensation circuitry coupled to the second terminal of the current sense circuitry, and the adaptive slope compensation circuitry including a multiplier;

a comparator having a first terminal, a second terminal, and a third terminal, the first terminal of the comparator coupled to second terminal of the current sense circuitry and to the second terminal of the adaptive slope compensation circuitry the adaptive slope compensation circuitry; and mode control logic having a first terminal and a second terminal, the first terminal of the mode control logic coupled to the third terminal of the comparator.

11. The switching converter controller of claim 10, wherein the adaptive slope compensation circuitry includes a first voltage-to-current converter having a first terminal and a second terminal, a second voltage-to-current converter having a first terminal and a second terminal, the multiplier has a first terminal, a second terminal, and a third terminal, the second terminal of the first voltage-to-current converter coupled to the first terminal of the multiplier, and the second terminal of the second voltage-to-current converter coupled to the second terminal of the multiplier.

12. The switching converter controller of claim 11, wherein the multiplier is a first multiplier, the adaptive slope compensation circuitry includes a second multiplier having a first terminal, a second terminal, and third terminal, the first terminal of the second multiplier coupled to the third terminal of the first multiplier.

13. The switching converter controller of claim 12, wherein the adaptive slope compensation circuitry includes a third multiplier having a first terminal, a second terminal, and third terminal, the first terminal of the third multiplier coupled to the third terminal of the second multiplier.

14. The switching converter controller of claim 13, wherein the first voltage-to-current converter is configured to receive an input voltage to a power stage at the first terminal of the first voltage-to-current converter, the second voltage-to-current converter is configured to receive an output voltage from a power stage at the first terminal of the second voltage-to-current converter.

15. The switching converter controller of claim 14, wherein the second multiplier is configured to receive a current ripple metric at the second terminal of the second multiplier, and the third multiplier is configured to receive a switching frequency at the second terminal of the third multiplier.

16. A switching converter controller comprising:

current sense circuitry;

adaptive slope compensation circuitry coupled to the current sense circuitry; and a comparator coupled to the current sense circuitry and the adaptive slope compensation circuitry, the adaptive slope compensation circuitry including an adjustable current source circuitry, a capacitor, and a switch, and the adaptive slope compensation circuitry configured to:

obtain input parameters and a switch control signal;

use the adjustable current source circuitry to adapt a slope compensation current responsive to the input parameters;

control the switch to adjust a charge on the capacitor responsive to the adapted slope compensation current and the switch control signal; and output a slope compensation signal based on the charge on the capacitor.

17. The switching converter controller of claim 16, wherein the adjustable current source circuitry is configured to:

convert an input voltage to a power stage to a first current;

convert and output voltage from a power stage to a second current; and adapt the slope compensation current responsive to the first current and the second current.

18. The switch converter controller of claim 17, wherein the adjustable current source circuitry is configured to:

determine a ratio of the second current relative to the first current;

multiply the ratio by a current ripple metric to obtain a first multiplication result;

multiply the first multiplication result by a switching frequency to obtain a second multiplication result; and adapt the slope compensation current responsive to the second multiplication result.

19. The switch converter controller of claim 17, wherein the adjustable current source is configured to:

determine a ratio of the second current relative to the first current;

multiply the ratio by a current ripple metric to obtain a first multiplication result;

multiply the first multiplication result by a switching frequency to obtain a second multiplication result; and adapt the slope compensation current responsive to the second multiplication result.

20. The switch converter controller of claim 17, further comprising mode control logic, wherein the switch converter controller is configured to:

combine the adapted slope compensation current with a current sense signal from the current sense circuit to obtain a compensated current sense signal;

provide the compensated current sense signal to the comparator to obtain a comparison result;

provide the comparison result to the mode control logic; and adjust switch control signals for a power stage responsive to the comparison result.

* * * * *